United States Patent [19]
Ettinger et al.

[11] Patent Number: 4,851,687
[45] Date of Patent: Jul. 25, 1989

[54] DETECTION OF NITROGEN IN EXPLOSIVES

[75] Inventors: Kamil V. Ettinger, Aberdeen, Scotland; Joseph H. Brondo, Jr., East Hampton, N.Y.

[73] Assignee: Scientific Innovations, Inc., Wainscott, N.Y.

[21] Appl. No.: 2,788

[22] Filed: Jan. 13, 1987

[51] Int. Cl.[4] .............................................. G01T 3/00
[52] U.S. Cl. ......................... 250/390.04; 250/370.05; 376/159
[58] Field of Search ............ 250/390 C, 252.1, 390 R, 250/354.1, 370 C, 370 I, 370 J, 370 K, 367; 376/158, 159

[56] References Cited

U.S. PATENT DOCUMENTS

| | | | |
|---|---|---|---|
| 3,124,679 | 3/1964 | Tittman et al. | 250/380 |
| 3,146,349 | 8/1964 | Jordan | 250/302 |
| 3,496,357 | 2/1970 | Weinzierl et al. | 376/159 |
| 3,668,401 | 6/1972 | Shah et al. | 250/252.1 |
| 3,832,545 | 8/1974 | Bartko | 250/369 |
| 3,955,086 | 5/1976 | Tsujii et al. | 250/252.1 |
| 3,997,787 | 12/1976 | Fearon et al. | 250/359.1 |
| 4,251,726 | 2/1981 | Alvarez | 250/302 |
| 4,259,577 | 3/1981 | Jakosky, Jr. et al. | 250/358.1 |
| 4,266,132 | 5/1981 | Marshall, III | 250/359.1 |
| 4,278,885 | 7/1981 | von Alfthan et al. | 250/370 |
| 4,622,200 | 11/1986 | Gold et al. | 250/370 |

OTHER PUBLICATIONS

Andersen et al., "Axial Channeling Radiation From MeV Electrons", Part V, Channeling Radiation, Nuclear Instruments and Methods 194 (1982), 209–224.

Primary Examiner—Janice A. Howell
Assistant Examiner—William F. Rauchholz
Attorney, Agent, or Firm—Scully, Scott, Murphy & Presser

[57] ABSTRACT

An apparatus and method for scanning an object for nitrogen for detecting the presence of explosives in luggage, parcels and the like. The object is placed in a cavity in which a thermal neutron flux is produced by introducing fast neutrons in the presence of a nuclear moderating material. A reaction between the thermal neutrons and the nitrogen contained in the object causes gamma rays to be emitted which are detected and transmitted to processing electronics to determine the concentration and position of nitrogen in the object. Thermal neutrons sensors are located within the cavity to monitor the amount of thermal neutrons and adjust the thermal neutron flux within the cavity in order to maintain an optimal thermal neutron flux density within the cavity. The adjustment may be effectuated by adjusting the accelerating potential of a neutron accelerator or by adjusting the position of a neutron moderator for use with an isotopic neutron source.

32 Claims, 8 Drawing Sheets

DETECTION OF NITROGEN IN EXPLOSIVES

BACKGROUND OF THE INVENTION

1. Field of the Invention

This invention is directed to an apparatus and method for scanning an object for nitrogen to determine the presence of explosives. More particularly, the invention is directed to an apparatus utilizing neutron capture which causes gamma rays to be emitted from the object that are detected and analyzed to provide a representation of the distribution of the nitrogen contained within the object.

2. Description of the Prior Art

A significant threat to human life and property exists when an explosive device is concealed in luggage or parcels brought into buildings, aircraft, etc. As a result, there is a need by both the public and private sector of the country for a reliable technique for the detection of such explosive devices. As the threat of terrorist activities throughout the world, especially in airports, has increased, the demand for an efficient and practical device for scanning luggage to determine the presence of explosives has intensified.

It is well known that explosives may be detected by sensing the amount of nitrogen in the object being examined. One technique of detecting nitrogen is by netron capture. Neutron capture is premised on the concept that many elements emit gamma rays as a result of bombardment by neutrons and further that the gamma ray spectra resulting from such radiation exhibit properties and characteristics of the element.

U.S. Pat. No. 3,124,679 utilizes neutron capture to determine the nitrogen content in objects. The object is placed within a chamber where it is irradiated with neutrons and the resulting gamma rays are detected. Those gamma rays having energy characteristic of neutron interactions with atoms of the element under analysis are selected from all other radiations and their rate of occurrence is measured. This technique attempts to detect explosives solely on the basis of total nitrogen content and is therefore inadequate in view of the nitrogen content in everyday articles made of wool, silk, and leather. Since no discrimination can be made of elements having similar amounts of nitrogen this technique would not be useful in differentiating between explosives and other elements in luggage.

U.S. Pat. No. 3,832,545 to Bartko, is directed to a neutron capture system for detecting the presence of explosives incorporating an array of gamma detectors in order to provide a nitrogen profile of the object. The invention utilizes gamma detectors of approximately 8-12 inches in width which would provide a coarse profile thereby making the device impractical for detecting the presence and location of explosives in luggage. This is especially true in view of the plastic explosives which may be formed into an innocent shape. Moreover, Bartko recognizes that the ultimate sensitivity of the system depends on the level of thermal flux at the detection location. However, presently, there is no device for effectively maintaining an optimal thermal flux density within the radiation chamber.

SUMMARY OF THE INVENTION

The present invention is directed to an apparatus and method for scanning an object for nitrogen and for determining the concentration and position of nitrogen in the object. The invention includes a housing having a cavity for receiving an object to be scanned and means for transporting the object through the cavity. Incorporated within the housing are means for producing a thermal neutron flux within the cavity. The thermal neutron flux is produced by the introduction into the cavity of fast neutrons from a fast neutron source. The fast neutrons interact with hydrogenous material contained within the object and are converted to slow or thermal neutrons. The thermal neutrons interact with the nitrogen atoms to cause high energy gamma rays to be emitted from the object. In addition, the inner walls of the housing are lined with hydrogenous material to aid in the thermalization. An optional adjustable pre-moderator may also be provided between the fast neutron source and the object.

Included within the housing are means for sensing the amount of thermal neutrons within the cavity. Coupled to the thermal neutron sensing means are means for automatically adjusting the thermal neutron flux in response to the amount of neutrons detected within the cavity. The adjustment permits a predetermined optimal neutron flux density to be maintained within the cavity.

The high energy gamma rays are detected by at least one primary radiation detector which produces output signals representative of the energy of the gamma rays. The primary radiation detector comprises an array of detectors arranged in a strip substantially less than the width of an average piece of luggage. As the object passes the primary detectors, the array of detectors, for example, a linear array, detect the gamma rays emitted by successive portions of the object. These signals are processed and stored in a computer. After the object has completely passed the scanning detectors, the computer reconstructs the signals to provide a visual representation of the distribution of nitrogen contained within the object.

The automatic adjustment of the fast neutron source in response to the detection of the thermal neutrons in the cavity permits the optimal flux density to be maintained at all times. Since each object being scanned may contain different levels of hydrogenous material there would ordinarily be different amounts of thermalization taking place within the different objects causing inconsistent detection results. The optimal thermal flux may be predetermined by placing test samples of pure nitrogen within the cavity and measuring the thermal flux needed to fully thermalize the sample.

There should be sufficient thermalization within the object to provide thermal flux throughout an entire cross-section of the object. The means for automatically maintaining the optimal flux density includes electronic processing circuitry coupled to the flux sensors for converting the amount of neutrons into electrical signals and a computer control for analyzing the signals and automatically adjusting the fast neutron source to maintain the desired thermal flux. Alternatively, the computer control will adjust the pre-moderator to increase or decrease the amount of moderating material to thereby selectively adjust the thermal neutron flux. The flux sensors are strategically located within the cavity to minimize the direct detection of fast neutrons.

One primary radiation detector in accordance with the invention includes means for converting the gamma rays into electrons and for passing electrons through a channeling crystal. The crystal emits channeling radiation only in response to electrons travelling substantially parallel to planes of the crystal lattice. A description of the channeling radiation phenomena may be found, e.g., in an article by Andersen, et al., Axial Channeling Radiation from MEV Electrons, Nuclear Instruments and Methods, 194(1982) 209-224. The directivity of the detector follows from the fact that the electrons produced in the conversion means have a charge distribution strongly peaked in the forward direction (see, e.g., A. Evans, The Atomic Nucleus, McGraw Hill) and only electrons moving in well defined planes of the crystal lattice produce channeling radiation. Thus, only gamma rays that impinge on the conversion means at an angle that causes electrons to pass through the crystal parallel to the planes of the crystal lattice will produce the channeling radiation. A radiation detector produces output signals in response to the channeling radiation that are analyzed to determine the concentration and position of nitrogen contained in the object.

In another embodiment, the primary gamma ray detector includes a conversion foil attached to an electron collimator having a plurality of channels with openings at opposed sides of the collimator. The foil converts gamma rays to electrons which then pass through the channels. On the other side of the channels are electron scintillators coupled to photomultipliers for producing output signals in response to the electrons.

In a preferred embodiment, there is included in the cavity a secondary radiation detector for detecting low energy gamma rays that are emitted from elements that may be used to conceal nitrogen by blocking the thermalization of the nitrogen atoms. An analyzer would indicate excessive amounts of such elements indicating possible means of bypassing the detection of nitrogen.

In addition to the obvious use of detecting the presence of explosives in luggage and other parcels entering airplanes and buildings the apparatus and method of the present invention will have many other applications. There are many uses for a high energy gamma ray detector in nuclear medicine. For example, it is important in connection with various medical treatments to determine the presence of nitrogen in the body. The device also has additional industrial uses such as to detecting flaws in welds and casts or identifying missing parts. The apparatus may also be used to detect the presence of elements other than nitrogen, such as gold, concealed in containers.

DETAILED DESCRIPTION OF THE INVENTION

Figure 1:
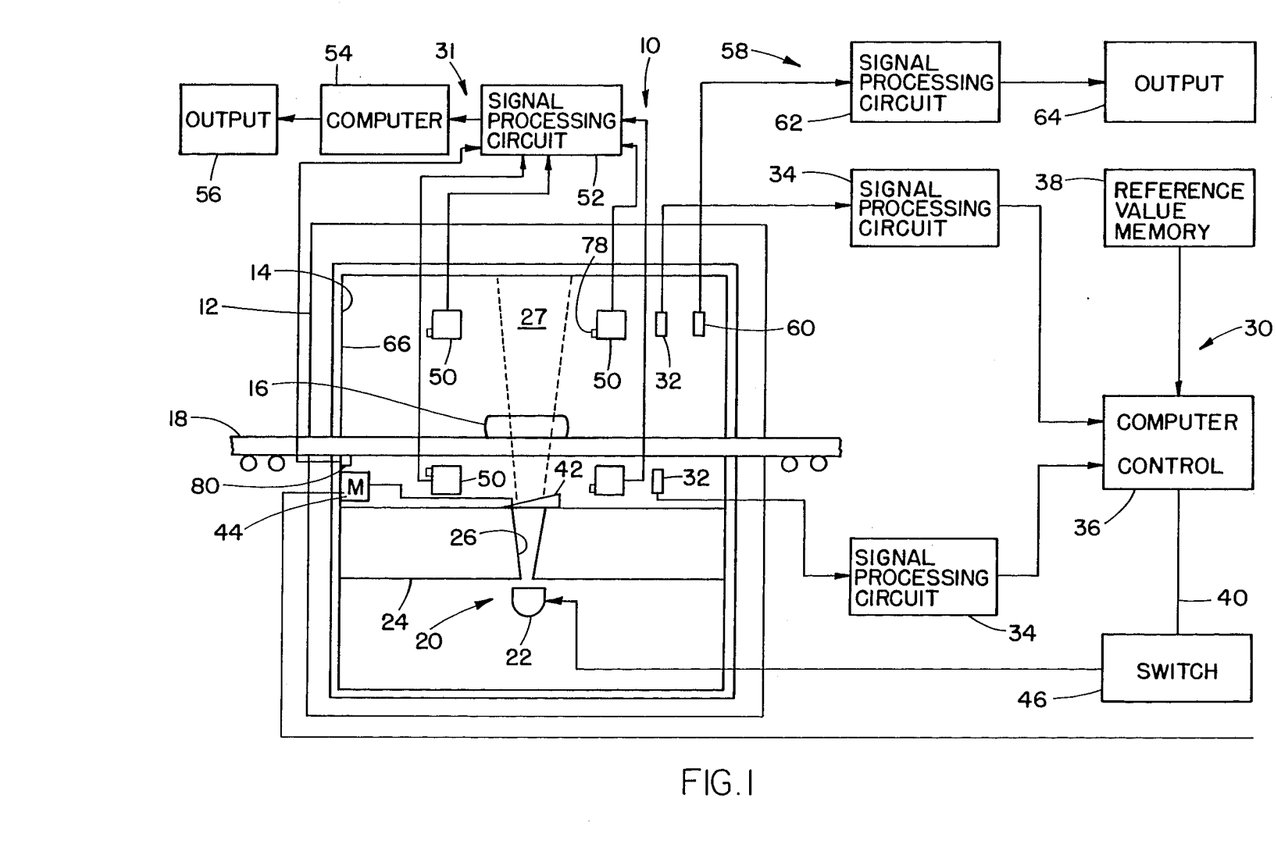
FIG. 1 is a schematic illustration of the apparatus for detecting the presence of nitrogen in accordance with the present invention.

The scanning apparatus of the present invention is generally indicated at 10 and includes a housing 12 having a cavity 14 for receiving an object 16 to be scanned. The housing includes a means 18 for transporting the object 16 through the cavity. The illustrative embodiment in FIG. 1, shows a conveyor belt to transport the object 16 through the cavity, however, any other suitable means may be utilized. Means 20 for producing a thermal neutron flux within the cavity includes a fast neutron source 22 and a neutron collimator 24. The collimator 24 includes a channel 26 for directing the beam of fast neutrons from the source into the cavity 14 through an irradiation zone 27. The thermal neutron flux produced within the cavity 14 interacts with nitrogen contained in the object 16 and causes gamma rays to be emitted therefrom. Means 31 detects the gamma rays and provides an output indicating the concentration and position of nitrogen contained within the object.

When exposed to thermal, or slow neutrons, the nuclei of most elements capture neutrons and form compound nuclei having an atomic weight one unit greater than that of the original nuclei. The probability that a thermal neutron will be captured by a given element for example is proportional to the concentration of the element in the sample, the concentration of thermal neutrons in the sample and the thermal neutron capture cross section which is a property of the element which varies from one element to another. The capture of a thermal neutron by a nucleus in this manner increases the energy of the new compound nucleus by an amount equal to the binding energy of the neutron. In order to return to a stable structure, the excited compound usually emits a gamma ray photon or photons which carry away the excitation energy. This process, called neutron capture gamma ray emission, leaves the compound nucleus in the lowest or ground state. Inasmuch as the neutron binding energy in a compound nucleus is a specific value for each isotope, and the manner of de-excitation is also specific, the gamma rays which are emitted constitute a characteristic spectrum for each element. Since the nuclei of an element emits these characteristic gamma rays in proportion to the concentration of the element and the concentration of thermal neutrons, quantitative determination of the concentration of the element can be made by measuring the intensity of radiation.

The sensitivity of the system, therefore, depends upon the level of thermal neutron flux within the cavity 14. Hence, it is important to maintain the thermal neutron flux within the cavity at a level to optimize the neutron capture process. In order to achieve this result, the apparatus 10 includes means 30 for adjusting the thermal neutron flux within the cavity in response to the amount of thermal neutrons. The means 30 includes a neutron detector 32 for detecting the amount of neutrons and producing electrical output signals representative of the sensed neutrons. The neutron detector should be based, for example, on nuclear reactions with nuclei of boron$^{10}$, lithium$^6$ or helium$^3$. An example of one neutron detector is a boron trifluoride counter tube.

Figure 2:
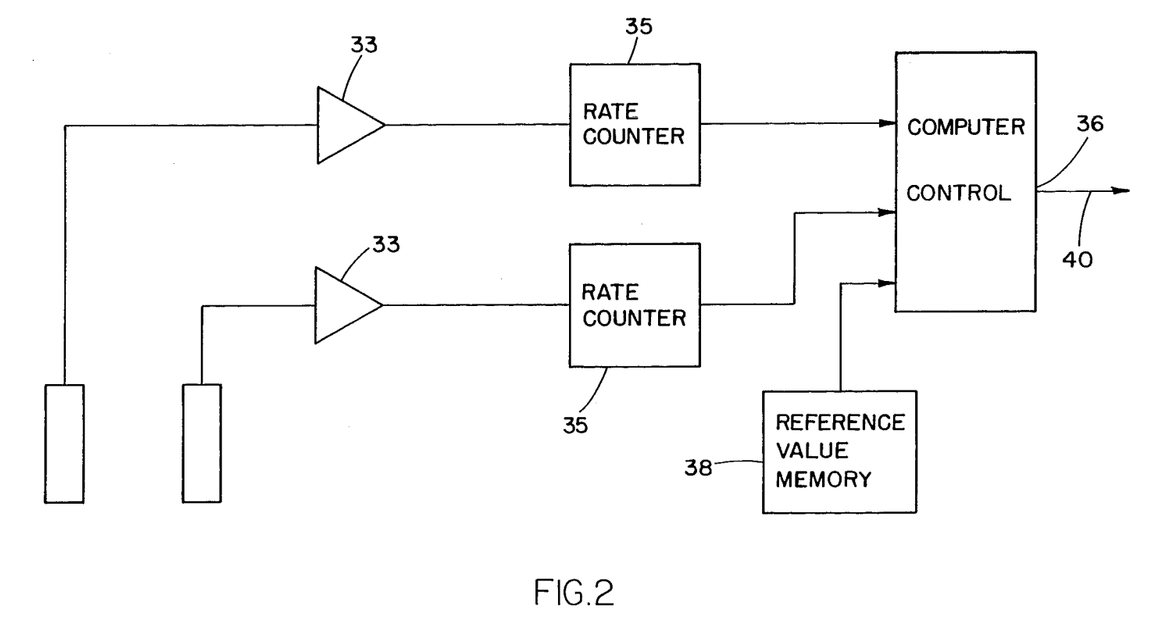
FIG. 2 is a block diagram of the processing circuitry for the flux sensors.

The detectors 32 are coupled to signal processing circuits 34 for processing the signals and inputting them to a computer control 36. Signal processing circuit 34 determines the amount of neutrons detected per unit time which is analyzed by the computer control 36 to determine the amount of thermal flux density within the cavity. FIG. 2 is one example of the processing circuit 34, which includes an amplifier 33 and a rate counter 35. The flux density is compared with the reference value stored in reference value memory 38 and provides a control signal on output 40 to automatically adjust the thermal neutron flux within the cavity. A computer control based on a comparison of sensed parameters and reference values is well known in industrial and medical applications. An example can be found in the numerical controlled drilling machines which utilize a linear multi-loop auto-control program.

FIG. 1 shows two methods by which the thermal flux density may be adjusted. The method used will depend upon the type of neutron source producing the fast neutrons. The fast neutron source may be an accelerator, such as a Van deGraaf accelerator. In this embodiment the control signal is coupled to the accelerator to adjust the accelerating potential either higher or lower in order to adjust the thermal neutron flux in the cavity 14.

In another embodiment, the neutron source 22 is an isotopic source such as californium 252, plutonium-beryllium or Americium-beryllium. The amount of fast neutrons emitted from an isotopic source cannot be adjusted. There is included, in this embodiment, a neutron moderator 42 movably alignable with the passage 26 of neutron collimator 24. The interaction of the fast neutrons with the low atomic weight nuclei of the moderator material causes the moderator material to absorb energy from the fast neutrons thus moderating or slowing the neutrons. Therefore, as a result of the collisions, substantial numbers of neutrons are reduced to thermal energy and may be more easily captured by the various atoms in the object in proportion to their relative abundance.

The control signal on line 40, in this embodiment, is coupled to a controller 44 that automatically adjusts the position of the moderator 42 to provide the desirable amount of moderation thereby adjusting the thermal neutron flux within the cavity 14. The moderator 42 may be any configuration to vary the amount of moderator exposed to the channel 26. The illustrative embodiment of FIG. 1 shows a wedge shape. The controller 44 may move the moderator 42 from side to side or rotatably to adjust the position. It is also contemplated that the moderator 42 may be provided in the apparatus having a neutron accelerator in which case there would be provided a switch 46 for selectively controlling either the fast neutron source or the moderator controller whichever is desirable. Another embodiment of this control mechanism is based on charging the reactor with a combination of Cf$^{252}$ and either Am—Be or Pu—Be forming a composite reaction source that may be adjustable.

The means 31 of FIG. 1 includes a plurality of gamma ray radiation detectors 50 within the cavity 14 for detecting the high energy gamma rays emitted by the object as the object passes the radiation detectors. The detectors 50 produce electrical output signals representative of the position and energy of gamma rays in discrete portions of the object. The signals are processed through processing circuit 52 and stored in the memory of computer 54. The processing circuit 52 processes the signals for each of the discrete portions of the object and inputs the information sequentially to the computer 54. After the object has passed the detectors 50 the computer can then analyze the signals and reconstruct a distribution image indicating the concentration and position of nitrogen contained in the object. This image may be provided in data output 56 which may be a computer screen or printout.

In the illustrative embodiment shown in FIG. 1, there is also included means 58 for detecting the presence of low energy gamma rays emitted from the object. These low energy gamma rays would be emitted by elements that may be used to conceal nitrogen which would prevent the thermal neutrons from reacting with the nitrogen atoms to produce the high energy gamma rays. Examples of such elements are cadmium, gadolinium and boron. The means 58 includes a low energy gamma ray detector 60 which will sense the gamma rays and produce output signals that are coupled to processing circuit 62. The signals are analyzed and outputted by data output 64 to indicate the presence of these particular elements.

More particularly, the housing 12 should be shielded in order to prevent the escape of neutrons. A suitable movable barrier may be provided to allow the entrance and exit of the conveyor. The housing may include an outer shell filled with water to act as a shield to absorb substantially all the neutrons not thermalized within the cavity. In addition, the housing may have an inner lining 66 of moderator material to enhance the neutron thermalization within the cavity. The moderator 42 and lining 66 may be a compound of normal or heavy hydrogen, such as water, parafin or polyethylene.

The configuration of the apparatus of FIG. 1 shows the object 16, such as a piece of luggage, passing through the cavity lying on one side on the conveyor 18. The source 22 is positioned below the conveyor and the detectors 50 are positioned above the conveyor. It is essential, therefore, that the conveyor belt be made of material that is transparent to gamma rays and neutrons. The conveyor belt must have negligible absorption of gamma rays and neutrons and have insignificant amounts of nitrogen.

Figure 3:
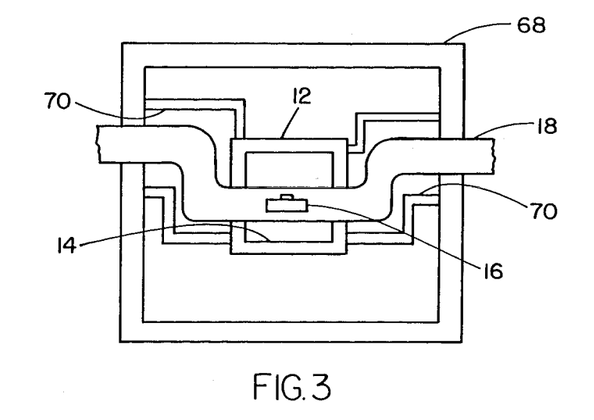
FIG. 3 is a schematic illustration of an alternate enclosure for the scanning apparatus.

FIG. 3 shows an alternative embodiment wherein the housing 12 is located within an outer enclosure 68 and the conveyor 18 moves the object 16 from outside the enclosure 68 through the cavity 14 and back out of the enclosure 68 in a maze type of configuration. The conveyor will be located within an inner tunnel 70 lined with water to absorb neutrons thereby minimizing the escape of neutrons from the enclosure 68.

The conveyor means 18 operates to carry the object 16 to be scanned through the cavity 14. The object passes each of the detectors 50 where the object will be scanned for the emission of gamma rays indicating the presence of nitrogen. Prior to describing the detectors, it is appropriate to describe the means by which the signals produced by the detectors are processed.

Figure 4:
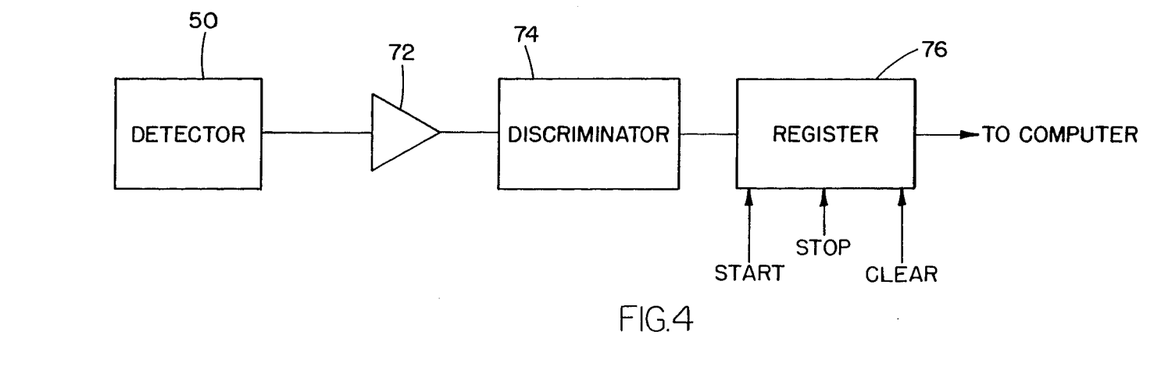
FIG. 4 is a block diagram of the detector circuitry for processing and analyzing signals from each of the detectors.

FIG. 4 shows a block diagram of the processing circuitry for one of the detectors 50. The output signal from detector 50 is amplified by amplifier 72 and the amplified signal is passed to discriminator 74 which will eliminate any low energy gamma rays that may have been detected. The gamma rays emitted from the thermalization of the nitrogen are generally in the range of 10.8 MeV. The signals are then inputted to a register 76 for addressing the output signals from each of the detectors in accordance with the timing pulse that operates the start, stop and clear inputs of the register 76. The register 76 stores information representative of the nitrogen within a discrete portion of the object. As the object passes by the detectors, the information representative of the concentration of nitrogen in the individual discrete portions of the object are sequentially entered into the register and then dumped into the computer for storage.

Figure 5:
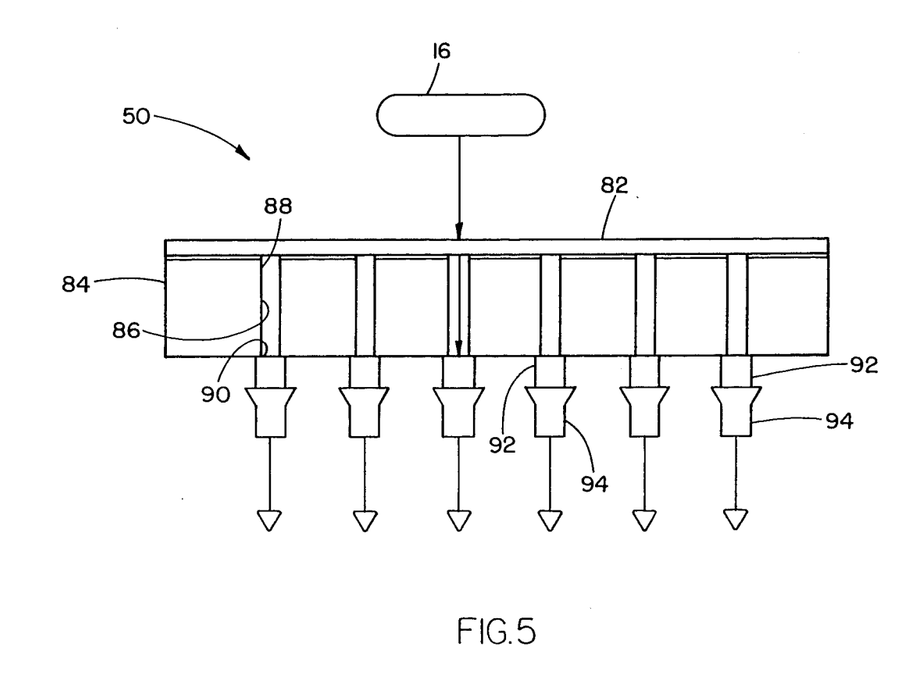
FIG. 5 is a schematic illustration of one embodiment of a gamma ray detector utilized with the present invention.

Each detector 50 includes a means 78, as shown in FIG. 1 and FIG. 5, for detecting the first edge of the object as the object passes the detector. The means 78 may, for example, be an optical sensor. A proximity switch 80 as shown in FIG. 1, senses the movement of the conveyor means 18 and sends a timing pulse signal to the register upon the passage of the desired discrete length of the object. This may be, for example, every quarter inch or every half inch as the object passes the detector. Thus, information will be stored in the computer representing the concentration of nitrogen for every discrete length of the object. The computer 54 reconstructs the stored information in the sequence received to provide a distribution image of the concentration and position of nitrogen contained in the object. Distribution imaging techniques are well known in nuclear medicine, for example, nuclear magnetic resonance imaging.

FIG. 5 shows one embodiment of a detector in the present invention. The detector 50 includes a conversion foil 82 for converting gamma rays into electrons and an electron collimator 84 having a plurality of channels 86 with openings 88 and 90 on opposed sides of the collimator. The conversion foil may be made of material having a high atomic number, such as lead, bismuth or uranium 238. The conversion of electrons is a function of atomic number and therefore these materials will have a high probability of conversion. The collimator may be made of any material such as metal or plastic. The conversion foil is secured to one side of the collimator covering the openings such that gamma rays emitted from the object 16 that impinge upon the foil 82 will be converted to electrons and pass through the corresponding channels 86. An array of electron scintillators 92 each coupled to a photomultiplier 94 are arranged to detect the electrons passing through the channels and to provide ouput signals representative of the position and energy of the nitrogen contained in that discrete portion of the object that is aligned with the detector at the time of detection. The scintillators 92 detect an electron and produce a flash of light in response. The flash of light is sensed by the photomultiplier 94 which converts that light into an electrical signal. The scintillator 92 may be made of organic or inorganic materials. Particularly suitable inorganic scintillators include sodium iodide, cesium iodide, bismuth or ortho germanate. Organic solids such as plastics that luminesce upon contact with electrons and stilbene would also be suitable.

Figure 6:
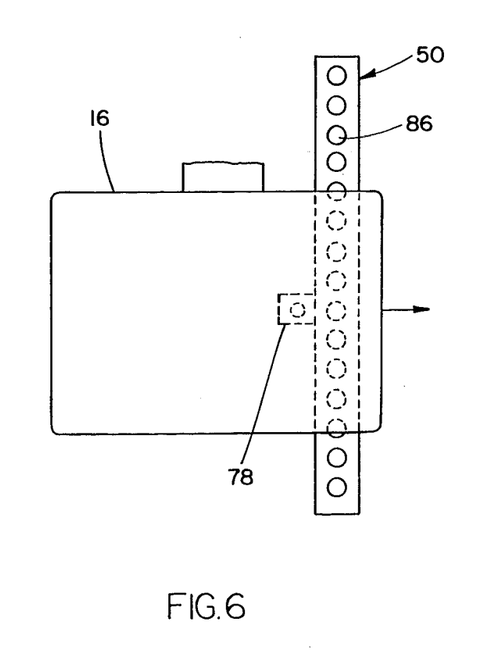
FIG. 6 is a schematic illustration of an object as it passes a detector.
Figure 7:
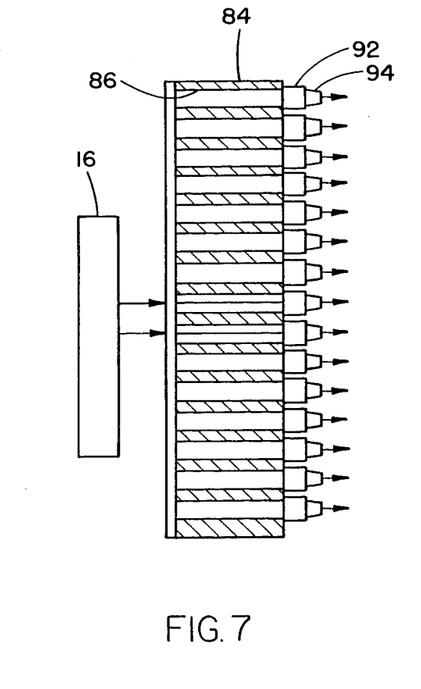
FIG. 7 is a side view of the detector shown in FIG. 5.

FIG. 6 is a schematic illustration of a detector 50 with the object, which in this example is a piece of luggage, passing the detector. FIG. 7 is a sideview of the luggage 16 and detector 50 of FIG. 6. FIGS. 6 and 7 are merely representative and are not meant to indicate the actual size of the detector 50. In actual practice, the detector 50 will include as many as 200 channels 86 in a single row providing very high resolution for the distribution image. The invention should not be limited to this type of detector as other detectors such as a Cerenkov counter or a multiwire gas chamber detector may also be used.

Figure 8:
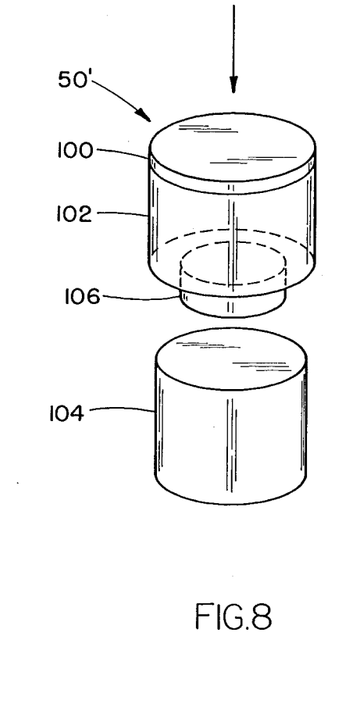
FIG. 8 is a schematic illustration of the directional channeling detector of the present invention.

FIG. 8 shows a schematic diagram of the channeling radiation detector of the present invention. The detector of FIG. 8 is an example of a single detector and it is understood that as with the detector shown in FIGS. 5 and 6 there will be as many as 200 secured together in a strip detector. The channeling detector 50' includes a convertor foil 100 secured to a channeling crystal 102. The channeling crystal produces channeling radiation in response to electrons that travel through the crystal substantially parallel to the plane of the crystal lattice. The electrons are produced by gamma rays impinging upon the convertor foil 100 and the distribution of velocities of these electrons is of the energies in question and is strongly peaked in the direction of the gamma photons. The channeling crystal may be made of an alkali halide, e.g., sodium chloride. A solid state channeling radiation detector, which for example may be made of germanium, detects the channeling radiation and produces an output signal representative of the concentration of nitrogen contained in the object. There is also included an electron semiconductor detector 106 that detects the electron passing through the crystal 102.

Figure 11:
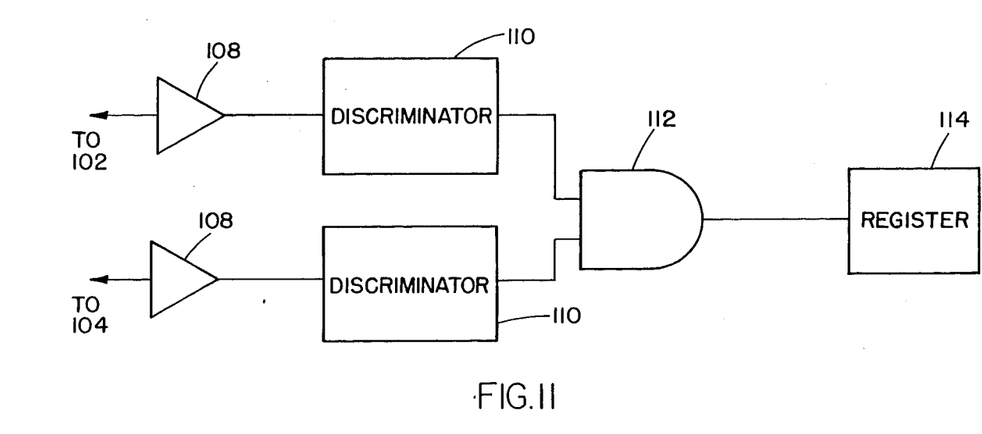
FIG. 11 is a block diagram of the processing circuitry for the channeling radiation detector.

As shown in FIG. 11, the output signals from the electron detector 102 and the channeling radiation detector 104 are coupled through amplifiers 108 and discriminators 110 to coincidence circuit 112. Coincidence circuit 112 may take the form of an AND gate that will produce an output signal only in response to the presence of signals from both the electron and channeling detectors. This will provide additional insurance that only signals from properly directed gamma rays will be inputted to the register 114.

Figure 9:
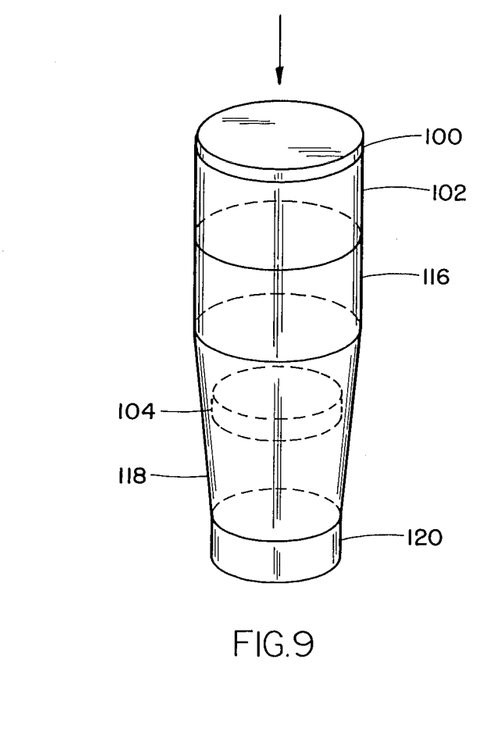
FIG. 9 is a schematic illustration of another embodiment of a directional channeling detector.

FIG. 9 is another embodiment of the channeling detector which includes a scintillation electron detector 116 and a corresponding light guide 118 and photomultiplier 120 to detect the presence of the electrons.

Figure 10:
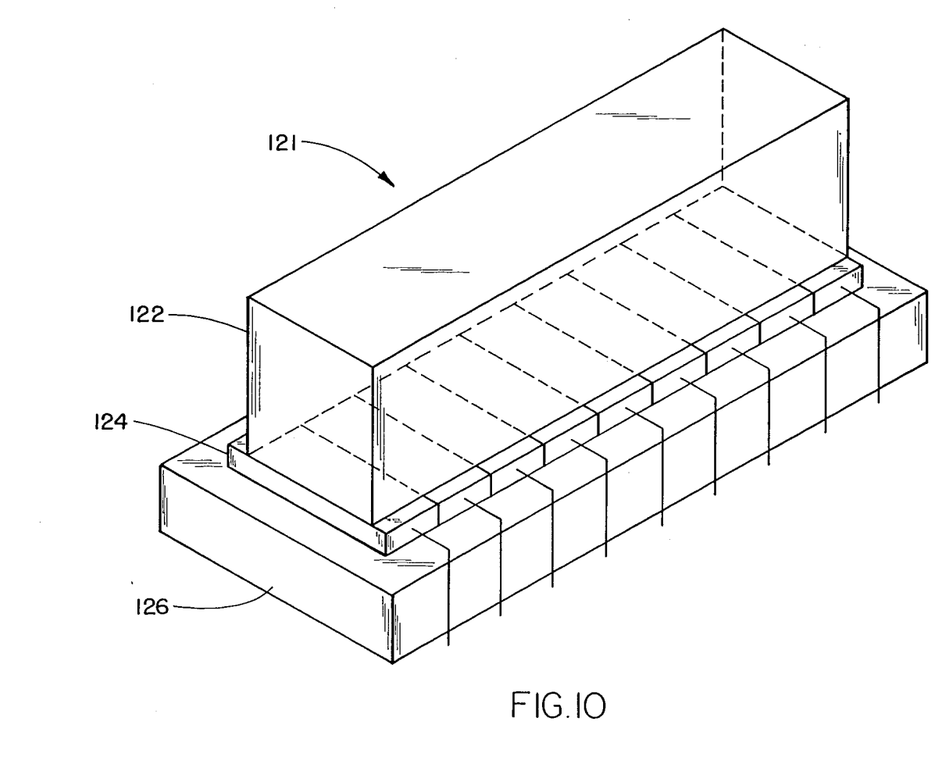
FIG. 10 is an isometric illustration of an integral bar channeling radiation detector.

As stated above, the detector would incorporate a plurality of channeling detectors as shown in FIG. 8 or FIG. 9, up to as many as 200, secured to a suitable backing material. Alternatively, FIG. 10 shows a channeling detector made of an integral strip of material. The monolithic detector 121 includes a strip of conversion foil material 122 secured to the solid state electron detector 124 and the solid state channeling detector 126. The detector 124 may be a surface barrier semiconductor detector. The detector 126 may contain a monolithic channeling crystal having electrodes embedded therein to detect where an event occurred. Alternatively, the detector 126 may be segmented crystals that are secured together in the strip.

Figure 12:
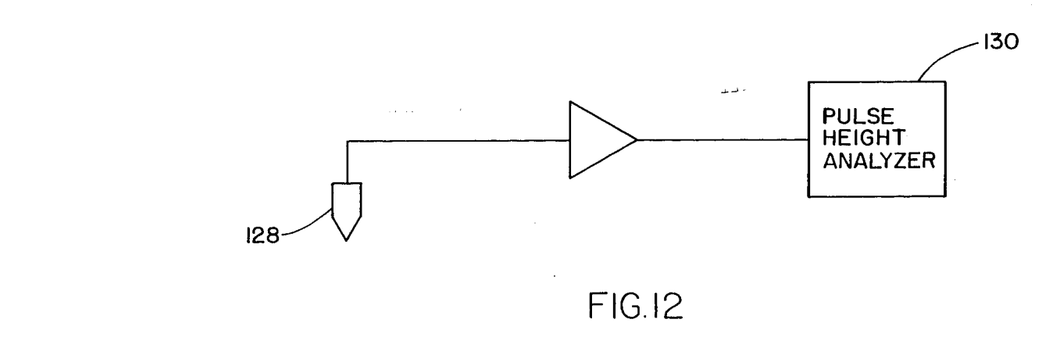
FIG. 12 is a block diagram of the secondary radiation detector.

FIG. 12 shows the anti-concealment means 58 including a low energy radiation detector which may be a solid state germanium type of detector coupled to a pulse height analyzer 130. The pulse height analyzer 130 will provide a display indicating the presence of materials such as gadolinium, cadmium or boron that may be utilized to shield the nitrogen from the detector. These materials produce gamma rays of a much lower energy and are therefore more easily detected by the solid state detectors. The pulse height analyzer 130 provides an indication of the total concentration of these elements in the object which may be observed by the operator as an indication of possible attempts to conceal nitrogen.

The channeling radiation detector of the present invention is particularly suitable for use in nuclear medicine. There are many medical procedures that require a knowledge of the amount of nitrogen in the body. Nuclear medicinal techniques safe for human subjects are known to cause gamma rays to be emitted from the subject. The gamma rays are then detected by the channeling radiation detector to produce the nitrogen distribution within the subject. Heretofore, there has been no reliable high energy gamma ray detectors available for these purposes.

While illustrative embodiments of the subject invention have been described and illustrated, it is obvious that various changes and modifications can be made therein without departing from the spirit of the present invention which should be limited only by the scope of the appended claims.

We claim:

1. An apparatus for scanning an object to determine the concentration and position of nitrogen in the object comprising:
   a housing having a cavity for receiving an object to be scanned and means for passing the object through said cavity;
   means for producing a thermal neutron flux within said cavity, said thermal neutron flux causing high energy gamma rays to be emitted from said object as the object passes through said cavity in response to reactions with nitrogen contained in said object;
   means for sensing the amount of thermal neutrons within said cavity;
   means for adjusting the thermal neutron flux within said cavity in response to the amount of thermal neutrons to maintain a predetermined thermal neutron flux density within said cavity;
   at least one primary radiation detector within the cavity for detecting the high energy gamma rays emitted by the object as the object passes said radiation detector(s) and for producing output signals representative of the position and energy of said gamma rays; and
   means for processing and analyzing said output signals for determining the concentration and position of nitrogen in said object.

2. The apparatus of claim 1, wherein said means for producing a thermal neutron flux includes a fast neutron source.

3. The apparatus of claim 2 wherein said means for sensing the amount of thermal neutrons includes at least one neutron flux sensor that produces electrical output signals representative of the amount of thermal neutrons within said cavity.

4. The apparatus of claim 3 wherein said means for adjusting the thermal neutron flux includes an amplifier and a rate counter coupled to each of said flux sensors for counting the electrical output signals, and a computer control means for determining the cavity thermal neutron flux density, said computer control means producing a control signal to adjust the thermal neutron flux within the cavity in response to the amount of thermal neutrons within said cavity.

5. The apparatus of claim 4 wherein said means for sensing the amount of thermal neutrons is located within said cavity in a position to minimize detection of fast neutrons.

6. The apparatus of claim 4 wherein said means for adjusting the thermal neutron flux includes a reference value memory means that inputs a reference signal representative of the predetermined neutron flux density into said computer control means for comparison with the cavity thermal neutron density determined from the amount of thermal neutrons inputted to said computer control means from said counters, said computer control means producing the control signal in response to a difference between the predetermined thermal neutron flux density and the cavity thermal neutron flux density.

7. The apparatus of claim 6 wherein said means for producing a thermal neutron flux further includes a neutron collimator having a passage for directing a beam of fast neutrons into an irradiation zone within said cavity.

8. The apparatus of claim 7 wherein said fast neutron source is an accelerator and the control signal from said computer control means adjusts the accelerating potential of said accelerator thereby adjusting the thermal neutron flux with said cavity.

9. The apparatus of claim 7 wherein said fast neutron source is an isotopic source.

10. The apparatus of claims 8 or 9 wherein said means for producing a thermal neutron flux further includes a neutron moderator movably alignable with the passage of said neutron collimator to be selectively within the beam of fast neutrons.

11. The apparatus of claim 10 further including means for selectively moving said neutron moderator within the beam of fast neutrons in response to the control signal from said computer control means.

12. The apparatus of claim 11 further including a switch means for selectively coupling said control signal to said means for moving said neutron moderator and said accelerator.

13. The apparatus of claim 6 wherein said housing includes a conveyor means for introducing said object to be scanned into said housing to pass said object through said irradiation zone.

14. The apparatus of claim 13 wherein said conveyor means is transparent to both neutrons and gamma rays.

15. The apparatus of claim 14 wherein said housing includes an inner lining of a neutron moderator material.

16. The apparatus of claim 15 wherein said housing is located within an outer enclosure and said conveyor means introduces the object first into said outer enclosure and second into said housing.

17. The apparatus of claim 1 wherein said means for analyzing said output signals includes means for providing an image of the nitrogen distribution contained within the object.

18. The apparatus of claim 1 wherein said means for analyzing said output signals includes register means for addressing the output signals from said detector(s) in accordance with a timing pulse thereby storing information representative of a plurality of discrete portions of object as the object passes said detector(s).

19. The apparatus of claim 18 wherein said radiation detector includes a conversion foil for converting the gamma rays into electrons, an electron collimator having a plurality of channels with openings on opposed sides of said collimator for receiving said converted electrons, said conversion foil being secured to said collimator to cover the openings on one side of said collimator, and an array of electron scintillators each coupled to a photomultiplier arranged to detect the electrons passing through each of said channels and to provide output signals representative of the position and concentration of nitrogen contained in said object.

20. The apparatus of claim 18 wherein said radiation detector includes a conversion foil for converting gamma rays into electrons, a channeling crystal coupled to said conversion foil for producing channeling radiation in response to electrons travelling through said crystal substantially parallel to the plane of the crystal lattice, an electron detector for producing first signals in response to electrons passing through said crystal lattice and a solid state channeling radiation detector for producing second signals representative of the position and concentration of nitrogen contained in the object.

21. The apparatus of claim 20 wherein said means for analyzing said output signals includes a coincidence circuit coupled to receive the signals from the electron detector and the channeling radiation detector for producing an output signal to said register only upon outputs being received from both the electron detector and the channeling detector.

22. The apparatus of claim 20 wherein said electron detector is a semiconductor surface barrier detector.

23. The apparatus of claim 20 wherein said electron detector is a scintillator coupled to a photomultiplier.

24. The apparatus of claim 1 further including at least one secondary radiation detector within the cavity for detecting low energy gamma rays emitted by the object due to reactions with one or more elements other than nitrogen and for producing output signals representative of the concentration of said element contained within the object and means for analyzing the output signals from said secondary radiation detector to determine the position and concentration of said element contained within the object.

25. A directional channeling detector for detecting the presence and location of radiation emitted from an object comprising:
means for converting the radiation into electrons;
a channeling crystal coupled to said converting means for producing channeling radiation in response to electrons travelling through said crystal at a direction substantially parallel to a plane of the crystal lattice;
an electron detector for producing a first signal in response to an electron passing through said crystal; and
a channeling radiation detector for producing a second signal in response to channeling radiation emitted by said crystal.

26. The detector of claim 25 further including means for processing said first and second signals to produce an output signal representative of the concentration of nitrogen in the object.

27. The detector of claim 25 wherein said electron detector is a scintillator coupled to a photomultiplier tube for generating output signals in response to the conversion of radiation into electrons.

28. A method of scanning an object for nitrogen and determining the location and concentration of nitrogen in the object, comprising:
placing an object to be scanned in a cavity;
producing a thermal neutron flux within said cavity causing gamma rays to be emitted from said object in response to reactions with nitrogen contained in said object;
sensing the amount of thermal neutrons within said cavity;
adjusting the thermal neutron flux within said cavity in response to the amount of thermal neutrons;
detecting said gamma rays and producing output signals indicative of the position and energy of said gamma rays; and
analyzing said output signals to determine the concentration and position of nitrogen in the object.

29. The method of claim 28 further including generating a control signal in response to the amount of thermal neutrons within the cavity for adjusting the thermal neutron flux within said cavity.

30. An apparatus for scanning a subject to determine the distribution of nitrogen in the subject comprising:
a housing having a cavity for receiving a subject to be scanned and means for passing the subject through said cavity;
means for causing gamma rays to be emitted from the subject due to the presence of nitrogen within the subject;
at least one radiation detector having a conversion foil for converting gamma rays into electrons, a channeling crystal coupled to said conversion foil for producing channeling radiation in response to electrons travelling through said crystal substantially parallel to a plane of the crystal lattice, an electron detector for producing first signals in response to electrons passing through said crystal lattice and a solid state channeling radiation detector for producing second signals representative of the position and concentration of nitrogen contained in the subject; and
means for processing said first and second signals to determine the distribution of nitrogen in the subject.

31. The apparatus of claim 30 wherein said electron detector is a semiconductor surface barrier detector.

32. The apparatus of claim 30 wherein said electron detector is a scintillator coupled to a photomultiplier.

* * * * *